United States Patent [19]

Doherty

[11] 4,121,055

[45] Oct. 17, 1978

[54] INTEGRATED PROGRAMMABLE COMMUTATION AND SIGNAL CONDITIONING CIRCUIT

[75] Inventor: Michael J. Doherty, Warrington, Pa.

[73] Assignee: Microcom Corporation, Warminster, Pa.

[21] Appl. No.: 803,636

[22] Filed: Jun. 6, 1977

[51] Int. Cl.² ............................................... H04J 3/04
[52] U.S. Cl. ........................... 179/15 A; 340/177 CA; 340/183
[58] Field of Search ........... 179/15 BA, 15 A, 15 BL, 179/15 AS; 340/177 CA, 183, 15.5 GC, 15.5 DP, 15.5 TS

[56] References Cited

U.S. PATENT DOCUMENTS

| 3,668,645 | 6/1972 | Reymond | 179/15 AS |
|---|---|---|---|
| 3,790,715 | 2/1974 | Inoue | 179/15 AS |
| 3,814,860 | 6/1974 | Pringle | 179/15 BA |
| 4,016,557 | 4/1977 | Zitelli | 340/15.5 GC |
| 4,031,504 | 6/1977 | Mioduski | 340/15.5 GC |
| 4,031,506 | 6/1977 | Siems | 179/15 BL |

*Primary Examiner*—David L. Stewart
*Attorney, Agent, or Firm*—Woodcock, Washburn, Kurtz & Mackiewicz

[57] ABSTRACT

An integrated fully programmable circuit is provided, with particular usefulness in the area of telemetry, for programmed commutating of multiple data inputs and signal conditioning, wherein only one amplifier path is utilized for conditioning of all channels of the commutated multiple data input signal. A programmable counter is employed to drive a gate matrix for cyclically commutating the multiple data inputs into connection with the conditioning path, the counter concurrently providing programmed inputs for switching predetermined circuit elements in the conditioning path corresponding to each parameter of each respective data input which is conditioned.

14 Claims, 1 Drawing Figure

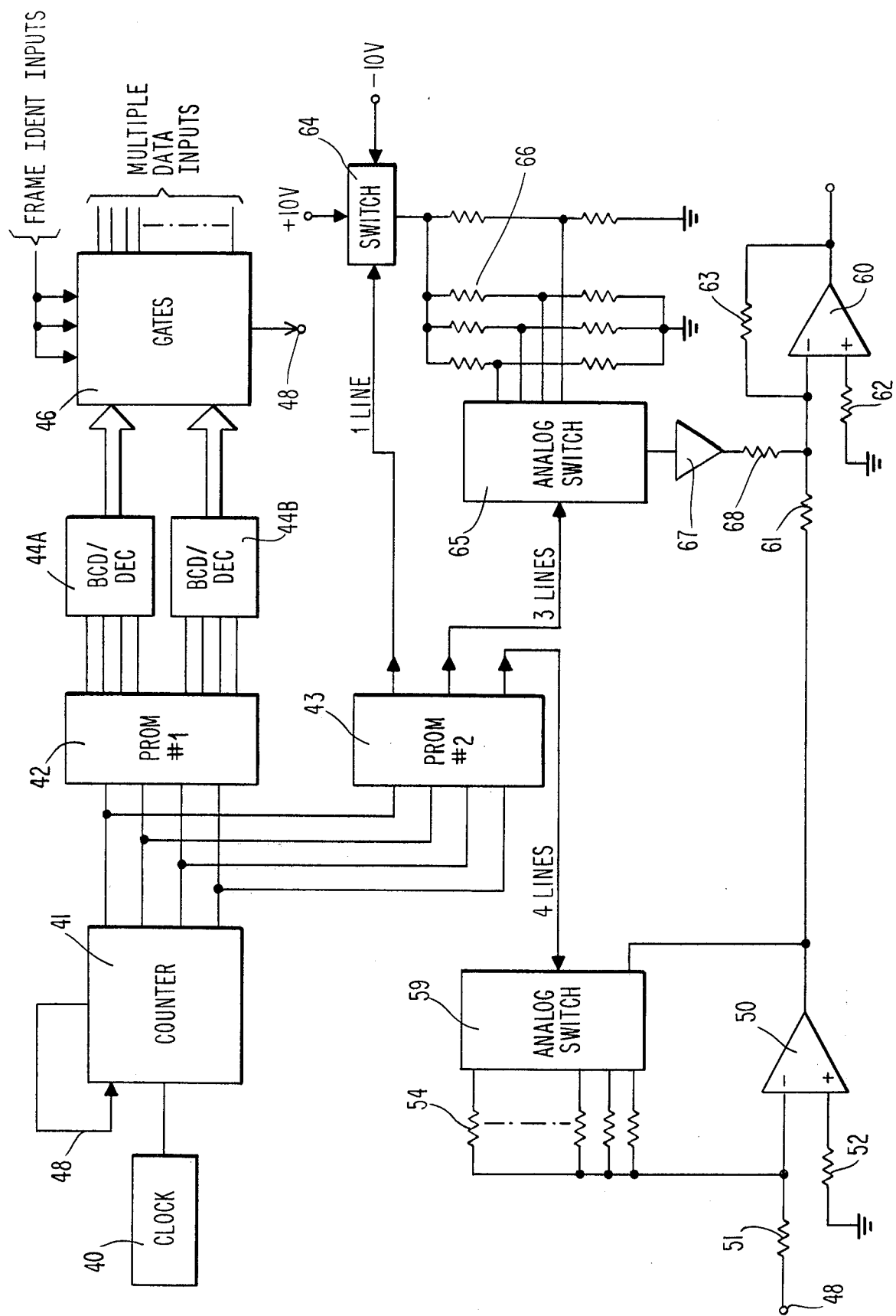

INTEGRATED PROGRAMMABLE COMMUTATION AND SIGNAL CONDITIONING CIRCUIT

BACKGROUND OF THE INVENTION

1. Field of the Invention

This invention relates to signal conditioning and commutation circuitry and, more particularly, to programmable integrated signal conditioning and commutation circuitry useful for telemetry and other like systems.

2. Background of the Invention

In a great many information processing systems, and in particular telemetry systems such as are utilized for communicating between ground stations and airborne vehicles such as missiles, an important subsystem of the telemetry system is that portion which commutates, or multiplexes a plurality of data inputs into a single communication channel, as well as conditioning the signals received from the multiple data input sub-channels so that they are of requisite form and condition for transmission. In such systems, the commutating or multiplexing is suitably time commutating, wherein each one of a large multiple of data inputs is sampled for a given time interval, or channel, such that a given "frame" of the communicated signal constitutes successive sampled signal levels corresponding to each one of the respective data inputs. The multiple data inputs are derived typically from multiple sensors, operating instruments, measuring devices, and the like, and consequently are non-uniform in terms of operating characteristics such as dynamic range, offset, source impedance, frequency characteristics, etc. In order that each channel, or data input, will be uniform and be compatible with the rest of the system, i.e., interface with the remaining part of the communication system, each signal is conventionally treated or conditioned in a separate conditioning path. Such conditioning paths conventionally are comprised of a plurality of active circuits, typically comprising operational amplifiers, wherein each amplifier stage is designed to condition the signal with respect to a respective different parameter. These parameters include, e.g., gain; offset; source impedance; and bandwidth. As is understood by those of skill in the art, such a conditioning path which is designed specifically to properly condition a signal received from a given source will not be able to properly condition a signal received from a different source. Consequently, where N inputs must be conditioned, there are N conditioning paths. Where N is of the order of 100, it is seen that the large number of conditioning paths adds considerably to the complexity, unreliability, and expense of the conditioning subsystem.

SUMMARY OF THE INVENTION

It is an object of this invention to provide an integrated circuit for programmable commutation and programmable signal conditioning, such circuit having a single signal conditioning path and having integrated programmed commutation and conditioning operation.

It is another object of this invention to provide a signal commutation and conditioning system of reduced size and expense.

It is a further object of this invention to provide an integrated and programmable signal commutating and conditioning system, which system is universally programmable to handle any kind of data encoded signals.

In accordance with the above objectives, there is provided an integrated system having a commutation portion and a signal conditioning portion, the commutation portion providing a commutated output which is connected to the conditioning portion, the conditioning portion comprising a single multiple stage amplifier path, the commutation and conditioning portions being synchronously programmed by clock pulses from a single clock source. The commutation portion is adaptable to be programmed for handling any predetermined number of data inputs, which data inputs can be encoded in any conventional fashion.

BRIEF DESCRIPTION OF THE DRAWING

The drawing is a block diagram illustrating the commutation and conditioning circuit of this invention.

DESCRIPTION OF THE PREFERRED EMBODIMENT

Referring now to the drawing, there is shown a clock circuit 40, which is a conventional clock which produces an output signal of any desired predetermined frequency and interval. As is shown by the discussion of the overall circuit, the frequency of the clock determines the channel width, i.e., the time interval or sample duration of each of the data inputs as it comprises the final commutated output signal. Clock pulses are communicated to a counter 41, which is pre-wired as shown at 48 to be reset to the zero state in accordance with the number of desired channels per frame, i.e., the number of data inputs to be commutated each frame. The counter may of course be permanently wired for a given number of channels per frame, but it may also be "loose" wired so that its count may be changed for different applications. In other words, a suitable arrangement would be to have the counter have a capacity to count from zero to 99, to accommodate any application where up to 100 channels might be used. If, for a particular application, 50 channels are to be used, the counter is simply wired to be automatically reset upon reaching the count of 49. If at a later time, it is desired to use the same hardware for a 35 channel system, the system can be easily modified by rewiring the counter to reset itself after a count of 34.

In the embodiment illustrated, counter 41 is suitably an 8 bit counter, having 8 outputs corresponding to the 8 different bit positions. In the diagram only 4 outputs are shown, but it is to be understood that there are actually 8 in the illustrated preferred embodiment. The output lines from counter 41 are connected both to program circuit 42, designated PROM #1, and programming circuit 43, designated PROM #2. PROM #1 and PROM #2 are commercially available integrated circuits, which can be programmed as desired to take the inputted binary signals from counter 41 and output stored programmed BCD words. The output of PROM #1 is illustrated as 2 sets of 4 lines each, with 4 bits being inputted to each of the BCD/DEC converters 44A and 44B respectively. The two BCD/DEC converters each provide as an output a 10 line decimal signal which is connected to the gate circuit 46, converter 44A transmitting a units signal and converter 44B transmitting a tens signal. Circuit 46, designated GATES, receives the multiple data inputs, and switches a particular one of such inputs to output terminal 48 depending upon the gating signals transmitted from converters 44A and 44B. Also inputted to circuit 46 are frame identification inputs, which are gated through in a conventional manner following sampling of each of the respective different data inputs. Thus, for the circuit illustrated, circuit 46 can provide commutation of up to 100 channels of data, less the number of channels used for frame identification (which is typically 5).

Referring now to the lower channel of the diagram as shown in the FIGURE, the commutated or time multiplexed signal at node 48 is passed through a conditioning path which is here illustrated as comprising two amplifier stages. It is to be understood that although the apparatus of this invention is illustrated with two conditioning amplifier stages, there is no limit to the number of amplifier stages which may be used within the scope of this invention. The first amplifier stage is comprised of operational amplifier 50, having its positive input terminal connected to ground through a resistor 52, and a resistor 51 connected from its negative terminal to the input node 48. The feedback resistance is a selected feedback resistor 54, or combination of a plurality of such resistors in parallel, depending upon the input to switch 59 which causes the switch to connect a programmed resistance between the output of amplifier 50 and the input. As is well known, the feedback resistance value, in combination with input resistor 51, sets the gain of the amplifier stage. By switching the desired effective resistance in as the feedback resistance, the gain may be determined. This is done by gating through from PROM #2 a 4-line, or 4-bit signal. Thus, for each respective count of counter 41, which corresponds to a given one of the multiple data inputs, there is concurrently connected a respective binary signal to analog switch 59, which determines the effective feedback resistance and thus the gain of the first amplifier stage. Note that PROM #2 is programmed such that, corresponding to each binary signal it receives from counter 41, it produces a programmed 4-bit output which sets switch 59 to give the gain desired for the channel that is being concurrently gated through circuit 46 to the conditioning path.

The operation of the second amplifier stage of the conditioning path is essentially the same as that of the first stage. This stage is illustrated as being designed to condition the amplifier to adjust for offset of the signal, so that the signal that is passed for each succeeding channel is within a predetermined voltage range. One bit from PROM #2 is connected through to switch 64, which has a +10 volt input and a −10 volt input. The one bit input switches either +10 volts or −10 volts through to resistor grid 66, which comprises a plurality of resistance dividers between switch 64 and ground. Each resistance divider has an output which is connected into analog switch 65. Switch 65 receives a 3-line input from PROM #2, such that it receives a 3-bit switching signal which is a function of counter 41 as well as the programming of PROM #2. Accordingly, for each channel, or respective sample of the data input, a predetermined offset voltage, either plus or minus, and of a particular value, is outputted from switch 65. This signal is connected to the input terminal of operational amplifier 60 through amplifier 67 and resistor 68. The gain of amplifier 60 is set by feedback resistor 63 and input resistor 61, the latter being connected between the negative input terminal of amplifier 60 and the output of amplifier 50. The positive terminal of amplifier 60 is connected through resistor 62 to ground.

As stated previously, any number of additional amplifier stages may be utilized, each designed to condition the commutated signal with respect to a given characteristic of that signal, and each being switchably programmed by a PROM to condition each channel in a desired manner.

The PROM units 42 and 43, as well as any other such units which are used, are commercially available circuits which can be pre-programmed as desired to give any desired translation of the binary output from counter 41 into binary coded decimal. For example, suppose the circuit as disclosed in the drawing has been used for commutating and conditioning 46 data channels connected to 46 particular channel inputs. For such use, the two PROMs are programmed in a specific coordinated manner. However, if the device is to be used for a different number of channels, or if the same signal sources are wired through to different input terminals of the gate circuit 46, then the PROMs can be re-programmed as necessary.

In summary, the circuit of this invention can accomodate any number of data inputs, and can carry out any number of conditioning steps. For whatever application, the gating of a specific channel is time coordinated with the programming of the conditioning stages. Thus, for the time interval that PROM #1 gates through a given channel, PROM #2 (and any additional PROMs as desired) sends appropriate control switches to the analog switches to set the conditioning stages as desired for that particular channel. Note also that it is not required that each channel need to be conditioned in each stage. Thus, if a given channel needs no offset adjustment, switch 65 feeds through a zero signal; if no gain is necessary, switch 59 switches in a feedback resistance equal to resistor 51, to provide unity gain; etc.

Accordingly, there is provided a universally adaptable integrated commutating and conditioning circuit, which is flexible in being programmable with respect to different system inputs, and which provides a significant savings in the space and expense required for the conditioning path.

I claim:

1. A functionally integrated commutation and conditioning circuit for deriving a commutated signal from a multiplicity of data inputs, comprising:
   a. timing means for providing cyclical timing signals;
   b. commutating means, driven by said timing signals, for successively gating signals from respective ones of said multiplicity of data inputs for respective predetermined channel intervals, to derive successive channels and thereby produce a multi-channel commutated signal;
   c. a conditioning path, having an input connected to the output of said commutating means and having a plurality of respective programmable conditioning stages; and
   d. programming means driven by said timing signals for successively and synchronously programming each of said stages in accordance with successive predetermined channel programs, each such channel program lasting for the interval of each respective channel.

2. The circuit as described in claim 1, wherein said timing means comprises a clock generator in combination with a counter, said counter being adjustable to define the number of channels per frame of said commutated signal.

3. The circuit as described in claim 1, wherein one of said conditioning stages comprises a switchable resistance network, and said programming means is connected to control said resistance network, whereby said stage is controlled to provide a switchable gain function in accordance with said programs.

4. The circuit as described in claim 1, wherein one of said stages comprises a switchable voltage reference in combination with a switchable resistance divider network, and said programming means is connected to control said divider network, whereby said stage is controlled to provide a switchable offset signal in accordance with said programs.

5. The circuit as described in claim 1, wherein said commutating means provides for each of said successive channels a pulse amplitude modulated signal representing respective ones of said multiple data inputs.

6. The circuit as described in claim 1, wherein each of said stages comprises an operational amplifier in combination with a switchable circuit having a plurality of circuit configurations providing a corresponding plurality of circuit characteristics, and said programming means is connected to control each of said switchable circuits, whereby each such stage is controlled to provide switchable characteristics in accordance with said programs.

7. The circuit as described in claim 6, wherein said programming means causes the switching of each of said stages to take place in time concurrence with said channel intervals.

8. The circuit as described in claim 6, wherein said programming means provides that the switching of each of said stages is synchronized with the gating of said commutating means.

9. The circuit as described in claim 8, wherein said programming means comprises at least one programmable circuit for receiving said timing signals and providing converted digital signals to each of said switchable circuits.

10. A functionally integrated commutation and conditioning circuit, for deriving a commutated signal from a multiplicity of data inputs, comprising:
   a. a commutating path having a plurality of inputs connected to multiple data channels, for successively gating sampled signals from respective ones of said data channels to derive a multi-channel commutated signal;
   b. a conditioning path connected to the output of said commutating means, and having means for providing a plurality of respective conditioning operations for each channel of said commutated signal; and
   c. means for synchronizing and programming the operation of said commutating means and said conditioning path, whereby said conditioning path operates with respective programmed characteristics for the time interval of each successive channel of said commutated signal.

11. The circuit as described in claim 10, wherein said conditioning path comprises a plurality of active stages, each of said active stages having a switchable circuit controlled by said synchronizing means for adjusting said stage to condition a predetermined characteristic of said commutated signal.

12. The circuit as described in claim 11, wherein said synchronizing means comprises counter means for generating a predetermined cycle of multiple-bit signals, said signals occurring periodically at a predetermined interval, first programming means driven by said counter means and having an output connected to said commutating path for controlling the timing of said commutating path, and second programming means driven by said counter means and connected to said conditioning path for controlling the timing and operation of the switching of each stage of said conditioning paths.

13. The circuit as described in claim 12, wherein the outputs of said first and second programming means are time synchronized.

14. A functionally integrated commutation and conditioning circuit for deriving a commutated signal from a multiplicity of data inputs, comprising:
   a. first program signal means, for providing a cyclical program signal, and comprising a counter adapted to cycle through a predetermined count and a clock generator connected to drive said counter;
   b. a commutating gating circuit, having a first set of inputs connected to multiple data channels, a second set of inputs adapted to receive gating signals, and an output for providing a commutated multiple channel signal;
   c. first programming means, connected to receive said program signals from said program signal means, and having means to convert said program signals in a predetermined manner, and having an output comprising a plurality of concurrent timing signals, said output being connected to said second set of inputs of said gating circuit;
   d. a conditioning path, having an input connected to the output of said gating circuit, and having a plurality of stages, each stage comprising a switchable circuit portion and including a switch having an input to receive a multiple bit stage switching signal and an output connected to said switchable circuit portion; and
   e. second programming means, having an input connected to receive said program signals, and a plurality of outputs, respective ones of said outputs being connected to respective inputs of each of said stage switches.

* * * * *